United States Patent

Muramoto

[11] Patent Number: 5,915,047
[45] Date of Patent: Jun. 22, 1999

[54] IMAGE PICKUP APPARATUS

[75] Inventor: Tomotaka Muramoto, Tokyo, Japan

[73] Assignee: Canon Kabushiki Kaisha, Tokyo, Japan

[21] Appl. No.: 08/413,779

[22] Filed: Mar. 16, 1995

Related U.S. Application Data

[63] Continuation of application No. 08/168,660, Dec. 16, 1993.

[30] Foreign Application Priority Data

Dec. 25, 1992 [JP] Japan ..................... 4-358972

[51] Int. Cl.$^6$ .............. G06K 9/40; G06K 7/10; G02B 13/16; H04N 5/225
[52] U.S. Cl. ............ 382/255; 382/254; 382/321; 348/335; 348/342; 348/351; 348/355
[58] Field of Search ................. 348/351, 342, 348/335, 181, 625, 352, 355; 359/291; 382/255, 321, 254

[56] References Cited

U.S. PATENT DOCUMENTS

| | | | |
|---|---|---|---|
| 4,065,788 | 12/1977 | Meier et al. .................. | 348/625 |
| 4,322,134 | 3/1982 | Turpin ........................ | 350/361 |
| 4,626,674 | 12/1986 | Oinoue ........................ | 250/201 |
| 4,638,364 | 1/1987 | Hiramatsu ..................... | 348/354 |
| 4,924,317 | 5/1990 | Hirao et al. .................. | 348/351 |
| 5,023,724 | 6/1991 | Ferren ........................ | 348/351 |
| 5,121,213 | 6/1992 | Nishioka ...................... | 348/335 |
| 5,231,489 | 7/1993 | Penney ........................ | 348/181 |

*Primary Examiner*—Bipin Shalwala
*Assistant Examiner*—Daniel G. Mariam
*Attorney, Agent, or Firm*—Robin, Blecker & Daley

[57] ABSTRACT

There is provided an image pickup apparatus capable of operating only at the time of occurrence of moiré and reducing the moiré without the need to use an optical low-pass filter and without degrading image quality. The image pickup apparatus is provided with a circuit for detecting, from an output signal of an image sensor, the amount of aliasing distortion (moiré) which occurs when sampling is performed at the pitch of pixels of the image sensor, and determining whether moiré has occurred. On the basis of the detected amount of moiré, the distance between a photographic lens and the image sensor is made to vary or electrical processing is applied to the output signal from the image sensor, thereby reducing the moiré. Also, an image signal appearing when the photographic lens is located at a position deviated from an in-focus position is subtracted from an image signal appearing when the photographic lens is located at the in-focus position, whereby only a moiré component is separated to be subtracted from the image signal appearing when the photographic lens is located at the in-focus position.

9 Claims, 5 Drawing Sheets

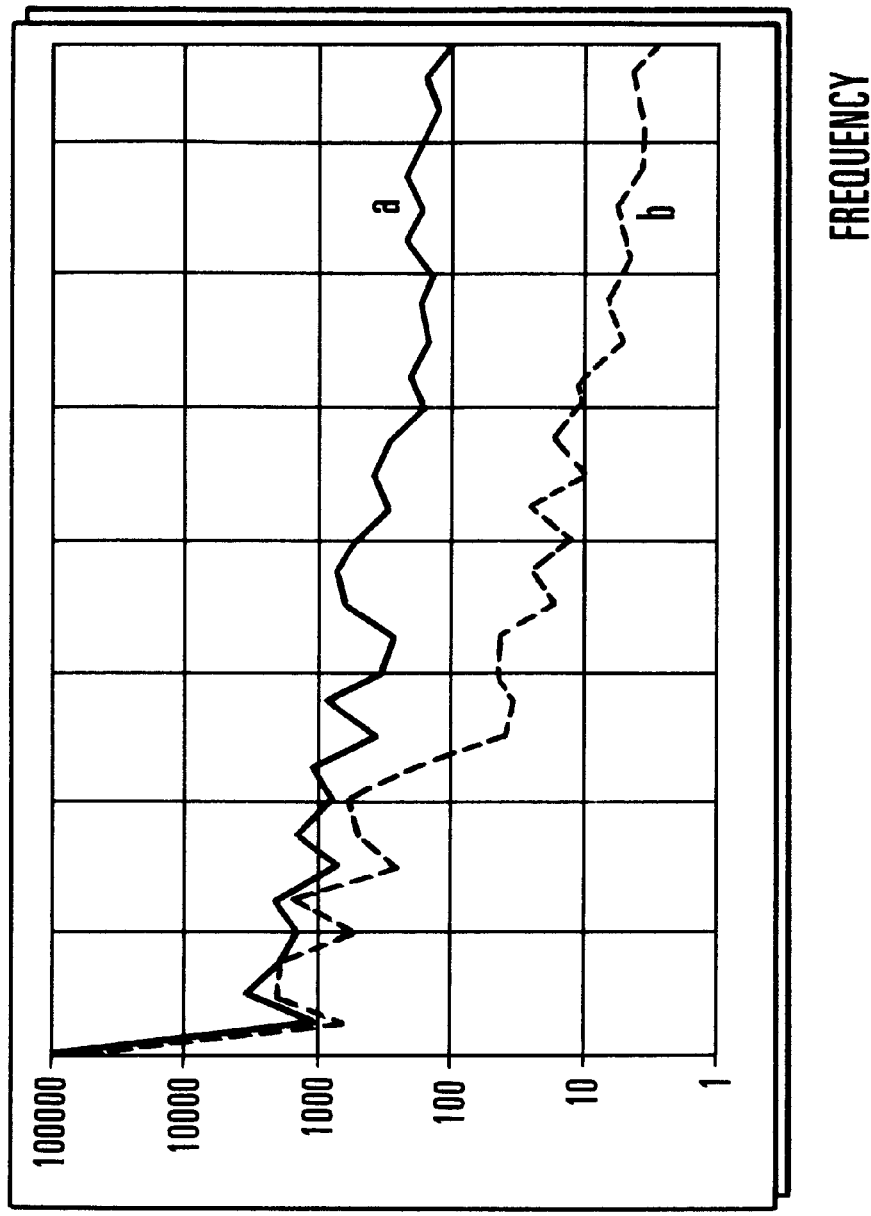

IMAGE PICKUP APPARATUS

This is continuation application under 37 CFR 1.62 of prior application Ser. No. 08/168,660, filed Dec. 16, 1993.

BACKGROUND OF THE INVENTION

1. Field of the Invention

The present invention relates to an image pickup apparatus using a solid-state image sensor such as a CCD and, more particularly, to an image pickup apparatus provided with an improved arrangement for reducing moiré.

2. Description of the Related Art

In a conventional type of image pickup apparatus using a solid-state image sensor, to suppress aliasing distortion (moiré) which occurs when sampling is performed at the pitch of pixels of the image sensor, an optical low-pass filter is inserted between a photographic lens and the image sensor so that a signal component of frequency near a sampling frequency is attenuated.

However, the above-described conventional image pickup apparatus has a number of problems such as the following ones.

In general, such an optical low-pass filter is produced by utilizing the nature of double refraction of crystal plate or the like. Since a plurality of crystal plates are sometimes used in the state of being placed one upon another to obtain vertical, horizontal and oblique refraction, an increase in cost is incurred. Further, because of the thickness of the optical low-pass filter, it is necessary to lengthen the back focal distance of a lens.

Further, there is the great problem that the optical low-pass filter impairs a signal of frequency below a Nyquist frequency because it is in principle impossible to impart a sharp attenuation characteristic to the optical low-pass filter.

SUMMARY OF THE INVENTION

An object of the present invention which has been made to solve the above-described problems is to provide an image pickup apparatus capable of reducing moiré without the need to use an expensive optical low-pass filter and without degrading image quality.

To achieve the above object, in accordance with one aspect of the present invention, there is provided an image pickup apparatus using a solid-state image sensor, such as a CCD, and the apparatus is provided with means for detecting, from an output signal of the image sensor, the amount of aliasing distortion (moiré) which occurs when sampling is performed at the pitch of pixels of the image sensor, and determining whether moiré has occurred. On the basis of the detected amount of moiré, the distance between a photographic lens and the image sensor is made to vary or electrical processing is applied to the output signal from the image sensor, thereby reducing moiré.

In accordance with another aspect of the present invention, there is provided an arrangement in which an image signal appearing when the photographic lens is located at a position deviated from an in-focus position is subtracted from an image signal appearing when the photographic lens is located at the in-focus position, whereby only a moiré component is separated to be subtracted from the image signal appearing when the photographic lens is located at the in-focus position.

In accordance with another aspect of the present invention, it is detected whether moiré has occurred, by making a comparison between the spectrum of an image signal appearing when the photographic lens is located at an in-focus position and the spectrum of an image signal appearing when the photographic lens is located at a position deviated from the in-focus position. In other words, if the photographic lens is deviated from the in-focus position, a power peak value greatly varies in the higher-frequency portion of a spectrum. The influence of this great variation of the power peak value in the higher-frequency portion appears as a great variation of a moiré signal in the lower-frequency portion of the spectrum. Accordingly, it is possible to detect the occurrence of moiré by detecting the respective variations of peak values in the higher-frequency portion and the lower-frequency portion of a power spectrum.

On the basis of the result of this detection, the apparatus is driven electrically and/or mechanically so that the moiré is reduced.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is an explanatory view aiding in explaining the principle of the present invention;

DETAILED DESCRIPTION OF THE PERFERRED EMBODIMENTS

Figure 1:
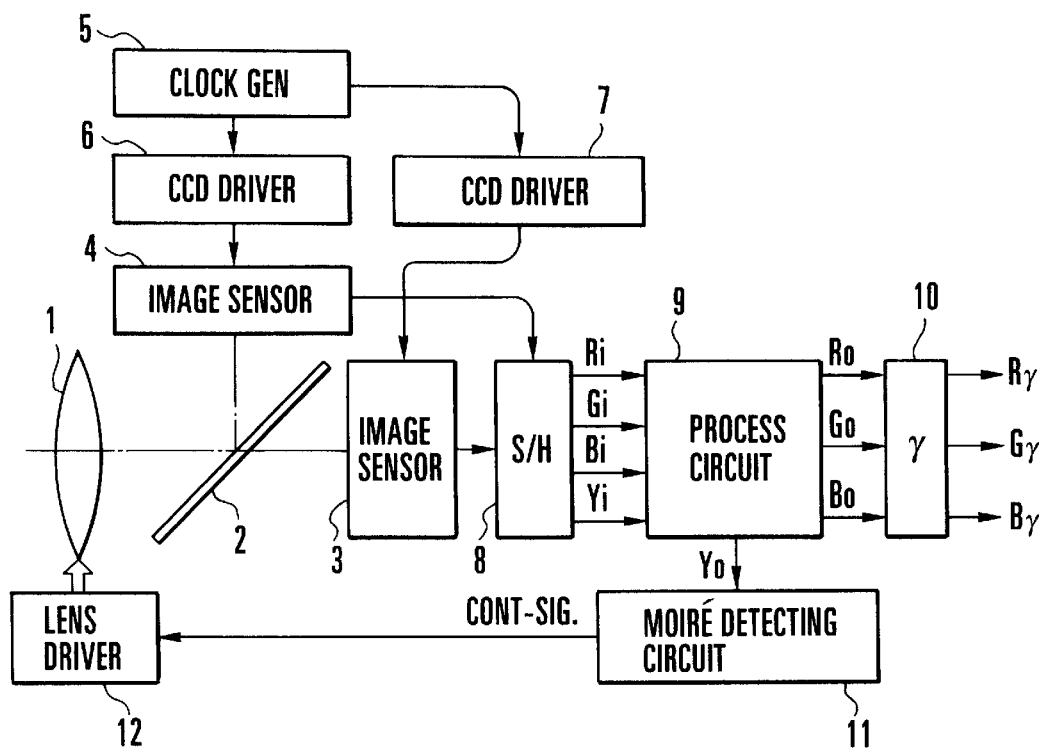
FIG. 1 is a schematic block diagram showing a first embodiment of the present invention.
Figure 2:
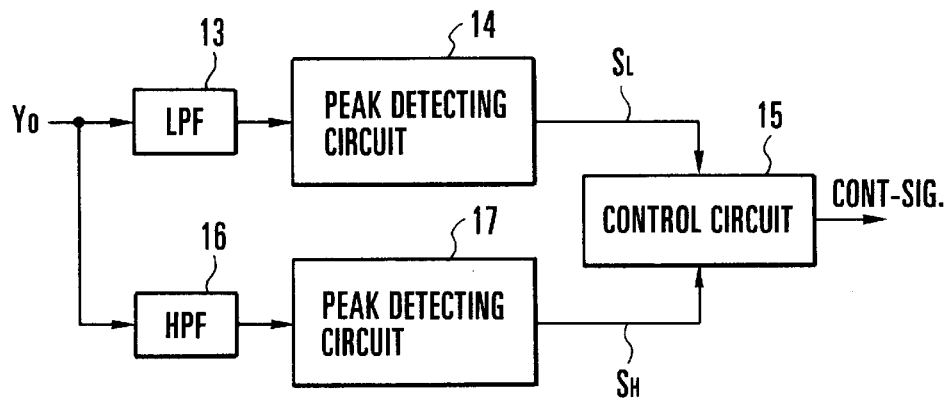
FIG. 2 is a block diagram showing in detail the arrangement of the moiré detecting circuit used in the first embodiment of the present invention.

FIGS. 1 and 2 show a first embodiment of the present invention.

Referring to FIG. 1, an image which has passed through a photographic lens 1 is made incident on a half mirror 2. The image passes through the half mirror 2 and is focused on an image sensor 3 for output of a luminance signal. At the same time, the image is reflected by the half mirror 2 and is focused on an image sensor 4 for output of a color signal. The luminance signal of the image is outputted from the image sensor 3 for output of a luminance signal, and is inputted to a process circuit 9 through a sample-and-hold circuit 8.

RGB color filters are adhered in striped form to the image sensor 4 for output of a color signal. An R signal, a G signal and a B signal are outputted from the image sensor 4 for each pixel and are separated from one another by the sample-and-hold circuit 8. The R signal, the G signal and the B signal are individually inputted to the process circuit 9.

The process circuit 9 performs adjustment of white balance. The R, G and B outputs from the process circuit 9 are subjected to gamma correction in a gamma conversion circuit 10, and the gamma-corrected RGB signals are outputted from the gamma conversion circuit 10.

In the meantime, the Y signal outputted from the process circuit 9 is inputted to a moiré detecting circuit 11. A lens driving circuit 12 is controlled by the output of the moiré detecting circuit 11 and causes the photographic lens 1 to travel so that moiré is reduced below an allowable limit.

FIG. 2 is a block diagram showing the arrangement of the moiré detecting circuit 11. The operation of the moiré detecting circuit 11 shown in the block diagram of FIG. 1 will be described below with reference to FIG. 3, FIGS. 4(A), 4(B) and FIG. 5.

FIG. 3 shows one example of the power spectrum of a luminance signal outputted from the process circuit 9. In FIG. 3, a solid line "a" represents a power spectrum obtained when the photographic lens 1 is located at an in-focus position, while a dashed line "b" represents a power spectrum obtained when the photographic lens 1 is deviated from the in-focus position. As can be seen from FIG. 3, if the photographic lens 1 is deviated from the in-focus position, the power of the luminance signal decreases in a range of higher frequencies as compared with the power spectrum obtained when the photographic lens 1 is located at the in-focus position. However, in a range of comparatively lower frequencies, the power obtained when the photographic lens 1 is deviated from the in-focus position does not greatly differ from the power obtained when the photographic lens 1 is located at the in-focus position.

Figure 4A:
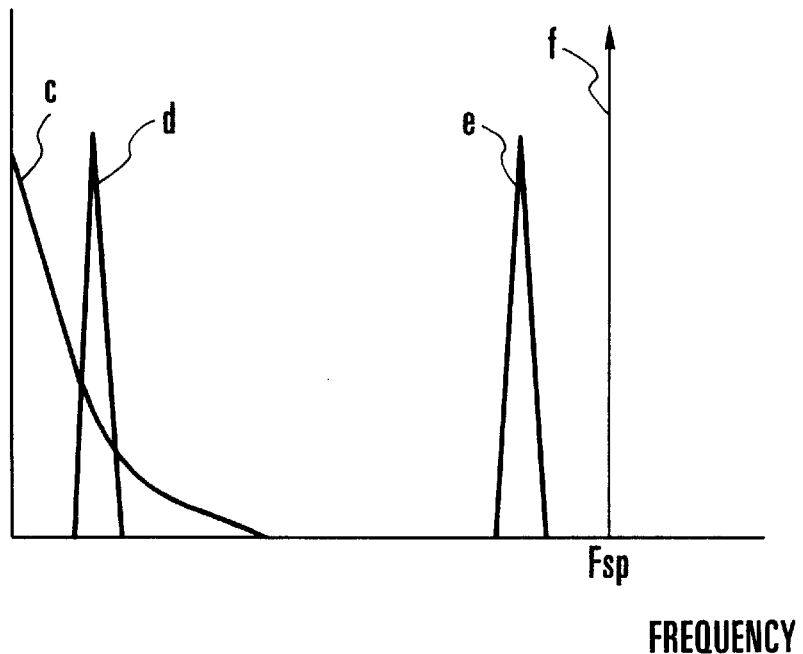
FIGS. 4(A) and 4(B) are explanatory views aiding in explaining the principle of the present invention.
Figure 4B:
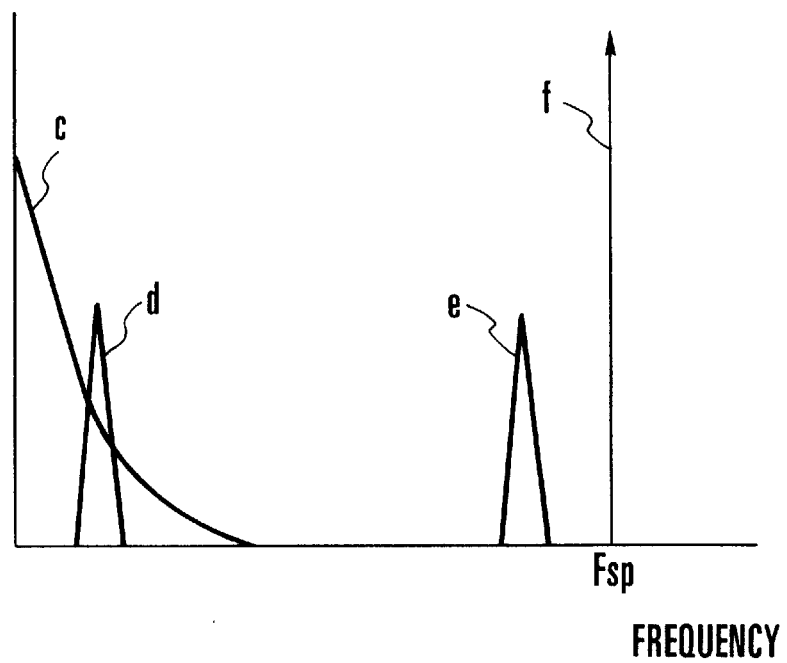

FIGS. 4(A) and 4(B) show different states of occurrence of moiré. As shown in FIG. 4(A), if a signal in which a signal of lower frequency, indicated by "c", is multiplexed with a signal of comparatively higher frequency, indicated by "e", is sampled at a sampling frequency Fsp, an aliasing distortion (moiré) occurs about a frequency Fsp/2 as shown by "d".

FIG. 4(A) shows the state of moiré occurring when the photographic lens 1 is located at the in-focus position. However, if the photographic lens 1 is deviated from the in-focus position, the state of the moiré varies as shown in FIG. 4(B).

As shown in FIG. 3, if the photographic lens 1 is deviated from the in-focus position, the power does not greatly vary in the range of lower frequencies, but greatly decreases in the range of higher frequencies. Accordingly, as shown in FIG. 4(B), the lower-frequency component "c" does not greatly vary, whereas the higher-frequency component "e" decreases. Correspondingly, the moiré component "d" also decreases.

As is apparent from the above description, even if a photographic lens is deviated from an in-focus position, the lower-frequency portion of an original image signal does not greatly vary in level. However, the power of a lower-frequency component which occurs as moiré sharply decreases if the photographic lens is deviated from the in-focus position. By utilizing this property, it is possible to determine whether moiré has occurred.

Referring back to FIG. 2, only a lower-frequency component is taken out from a luminance signal Yo inputted from the process circuit 9 by a low-pass filter 13, and is inputted to a peak detecting circuit 14. In the meantime, the luminance signal Yo is also inputted to a high-pass filter 16, and a higher-frequency component is taken out from the luminance signal Yo by the high-pass filter 16 and is inputted to a peak detecting circuit 17. The outputs from the peak detecting circuits 14 and 17 are both inputted to a control circuit 15. The control circuit 15 monitors variations $\Delta S_H$ and $\Delta S_L$ of the peak values of the respective higher- and lower-frequency ranges while moving the photographic lens 1, and checks to what extent the lower-frequency range varies with respect to a variation of the higher-frequency range: that is, $\Delta S_L/\Delta S_H$ is checked.

If the $\Delta S_L/\Delta S_H$ ratio of the variation of the lower-frequency range to the variation of the higher-frequency range at this time is smaller than a predetermined value, it is determined that moiré is below the allowable limit. If the $\Delta S_L/\Delta S_H$ ratio is greater than the predetermined value, it is determined that the moiré exceeds the allowable limit, and control is performed so that the photographic lens 1 is inhibited from stopping at the in-focus position.

According to the above-described embodiment, since it is possible to perform control so that a photographic lens is made to deviate from its in-focus position only when moiré has occurred, it is possible to achieve a resolution corresponding to the possible highest Nyquist frequency during ordinary photography. Further, if moiré occurs in an image, it is possible to optically defocus the image to the extent that the substantial influence of the moiré can be ignored.

In the above-described embodiment, an A/D converter may be provided at the input side of the process circuit 9 so that an input signal is converted into a digital signal before the subsequent processing is performed. With this arrangement, it is possible to easily detect not only horizontal moiré but also vertical or oblique moiré. This arrangement may also be combined with a frame memory.

Figure 5:
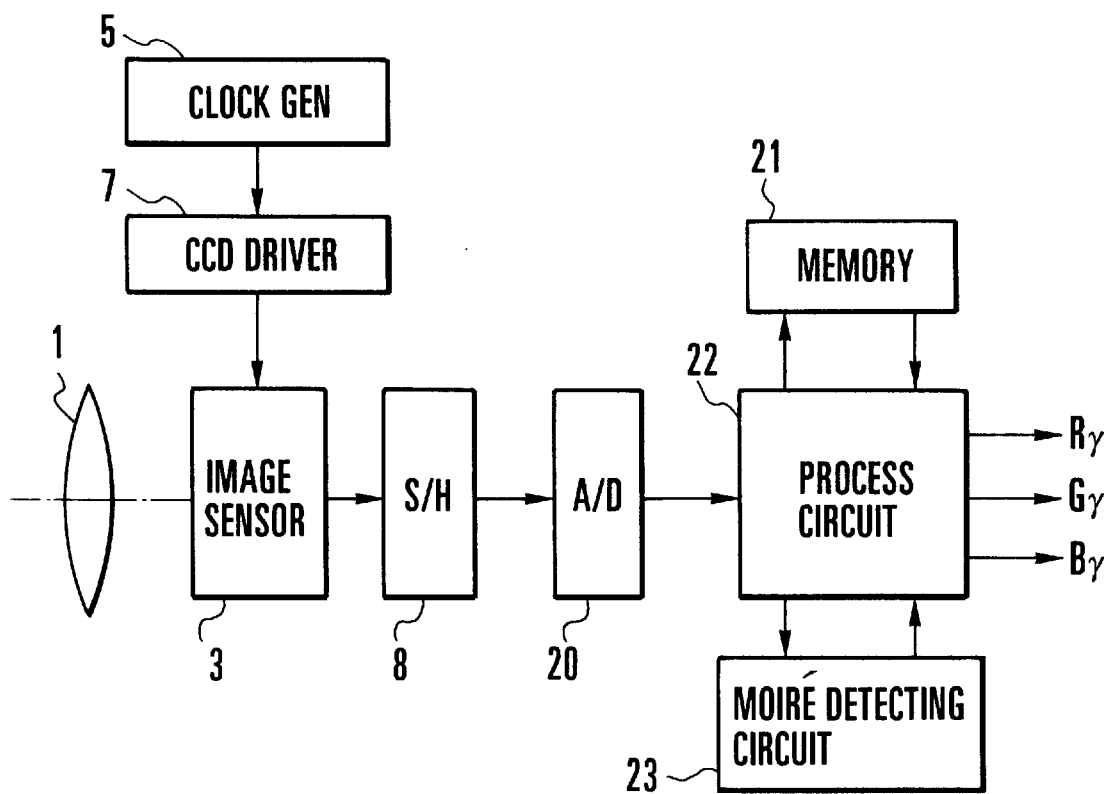
FIG. 5 is a schematic block diagram showing a second embodiment of the present invention.

FIG. 5 shows a second embodiment of the present invention.

Referring to FIG. 5, an image which has passed through the photographic lens 1 is focused on the CCD image sensor 3. RGB color filters are adhered to the image sensor 3 in mosaic form. The output signal from the image sensor 3 is inputted to the sample-and-hold circuit 8, and the output signal from the sample-and-hold circuit 8 is converted into a digital signal by an A/D converter 20. The signal outputted from the A/D converter 20 is formed into 3-channel RGB signals by a process circuit 22, and the 3-channel RGB signals are outputted from the process circuit 22. The process circuit 22 is connected to a memory 21 so that image data can be temporarily saved. A moiré detecting circuit 23 makes, when the photographic lens 1 is driven, a comparison between the amount of variation of the level of a comparatively higher-frequency range of the luminance signal inputted from the process circuit 22 and the amount of variation of the level of a comparatively lower-frequency range of the luminance signal. If the level of the lower-frequency range greatly varies with the variation $\Delta S_H$ of the level of the higher-frequency range being large, that is, if $\Delta S_L/\Delta S_H$ is greater than a predetermined value, the moiré detecting circuit 23 determines that moiré has occurred, and sends a warning signal indicative of the occurrence of the moiré to the process circuit 22.

If the moiré has occurred, the process circuit 22 performs digital filter processing to reduce the influence of the moiré.

According to the second embodiment, it is possible to perform anti-moiré processing of only the portion of one picture in which moiré has occurred. The second embodiment also presents an outstanding effect in the case where the number of pixels which will be finally required is small with respect to the total number of pixels of an image sensor.

Figure 6:
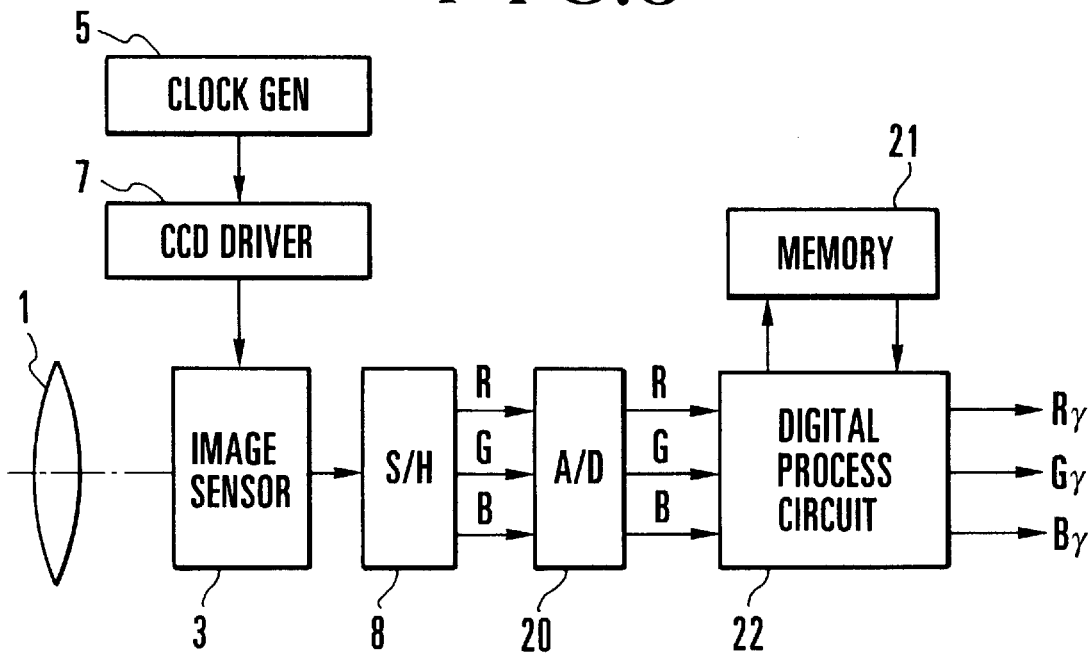
FIG. 6 is a schematic block diagram showing a third embodiment of the present invention.

FIG. 6 shows a third embodiment of the present invention.

Processing which is performed by using the memory 21 by the digital signal process circuit 22 is similar to that described above in connection with the second embodiment shown in FIG. 5, and description thereof is omitted.

Figure 7:
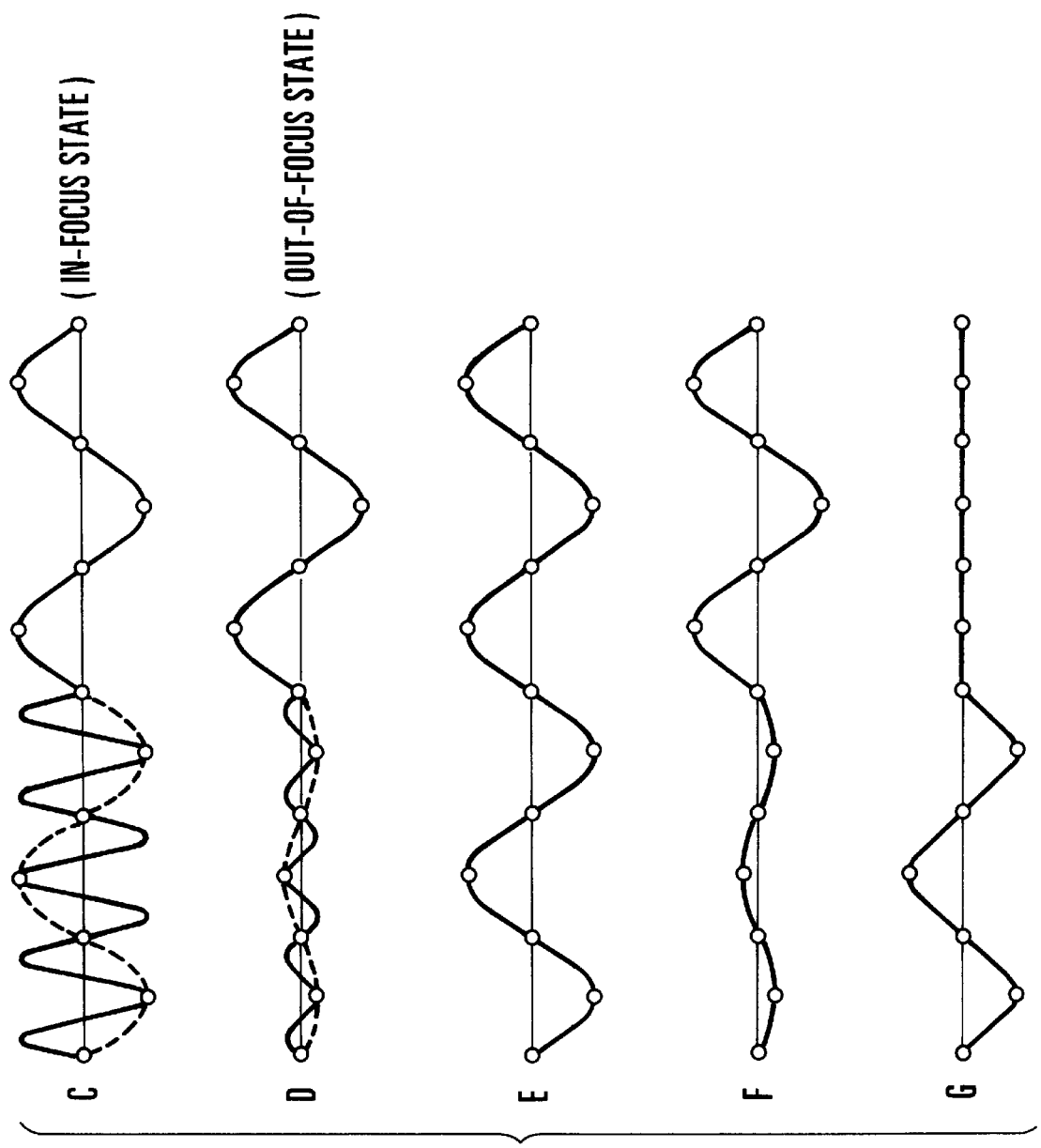
FIG. 7 is a waveform diagram aiding in explaining the second and third embodiments of the present invention.

FIG. 7 shows waveforms plotted along a time axis, and shows the principle of moiré detection which is performed in the arrangement shown in FIG. 6. In FIG. 7, a waveform C represents a waveform which appears when the photographic lens 1 is placed in its in-focus state, and a waveform D represents a waveform which appears when the photographic lens 1 is deviated from the in-focus state. The parts shown as "○" in each of the waveforms C and D as well as waveforms E, F and G represent sampling points. In each of the waveforms C and D, the waveform plotted by a solid line is a signal waveform before sampling and the frequency of the left-hand half of the signal waveform is higher than the Nyquist frequency. As a result, as shown by a dashed line, the signal waveform is folded into a signal waveform of lower frequency. The result of sampling of the waveform C is the waveform E, while the result of sampling of the waveform D is the waveform F. As is apparent from a comparison between the waveforms E and F, the component which has occurred due to the aliasing decreases if the photographic lens 1 is made to deviate from the in-focus state. Accordingly, by subtracting the signal of waveform F from the signal of waveform E, it is possible to separate and take out the moiré component shown as the waveform G.

On the basis of the above-described principle, the digital signal process circuit 22 separates and takes out a moiré component by subtracting a signal which appears when the photographic lens 1 is not located at an in-focus position from a signal which appears when the photographic lens 1 is located at the in-focus position. Furthermore, the process circuit 22 obtains a moiré signal by filtering only a visually conspicuous frequency component.

By subtracting the obtained moiré signal from the signal which appears when the photographic lens 1 is placed in the in-focus state, it is possible to obtain an image signal free of moiré.

In accordance with the present invention, means is provided for detecting moiré from an output signal of an image sensor, and means is also provided for reducing the moiré.

Also, it is possible to eliminate moiré from an image in which the moiré has occurred, by separating a moiré component by subtracting an output signal of the image sensor which appears when a photographic lens is not placed in an in-focus state from an output signal of the image sensor which appears when the photographic lens is placed in the in-focus state. Accordingly, an optical low-pass filter can be omitted to reduce cost, and the back focal length of the photographic lens can be shortened.

What is claimed is:

1. An image pickup apparatus, comprising:
    detecting means for detecting a lower-frequency component level and a higher-frequency component level of a luminance signal which is generated when a photographic lens is located at an in-focus position and for detecting a lower-frequency component level and a higher-frequency component level of a luminance signal which is generated when a photographic lens is located at a position displaced from the in-focus position, and finding a difference between the lower-frequency component levels and a difference between the higher-frequency component levels and moiré detecting means for outputting a signal indicative of occurrence of moiré by comparing the difference between the lower-frequency component levels with the difference between the higher-frequency component levels.

2. An image pickup apparatus according to claim 1, further comprising means for displacing the photographic lens, in response to the signal indicative of occurrence of moiré outputted from said moiré detecting means, to a position reducing moiré.

3. An image pickup apparatus according to claim 1, wherein said moiré detecting means includes filter means operative for inhibiting passage of a predetermined frequency component of each of the respective luminance signals.

4. An image pickup apparatus for obtaining an image signal with reduced moiré, said apparatus comprising a signal processing circuit for subtracting an image signal which is generated when a photographic lens is located at a position displaced from an in-focus position from an image signal which is generated when the photographic lens is located at the in-focus position, and subtracting the difference signal from the image signal which is generated when the photographic lens is located at the in-focus position.

5. An image pickup apparatus, comprising:
    detecting means for detecting a variation of a lower-frequency component level and a variation of a higher-frequency component level of an image signal while varying a position of a photographic lens; and
    moiré detecting means for detecting a moiré by comparing said variation of lower-frequency component level and said variation of higher frequency component level of said image signal and for forming a moiré detection signal.

6. An image pickup apparatus according to claim 5, wherein said detecting means includes a plurality of electrical frequency filters.

7. An image pickup apparatus according to claim 5 further comprising correcting means for correcting the moiré detected by said moiré detecting means.

8. An image pickup apparatus according to claim 7, wherein said correcting means includes electrical frequency filter means.

9. An image pickup apparatus according to claim 5, wherein said detecting means includes drive means for moving said photographic lens.

* * * * *